W. C. HOUSHOLDER.
TEMPERATURE REGULATING AND INDICATING DEVICE.
APPLICATION FILED MAR. 14, 1916.

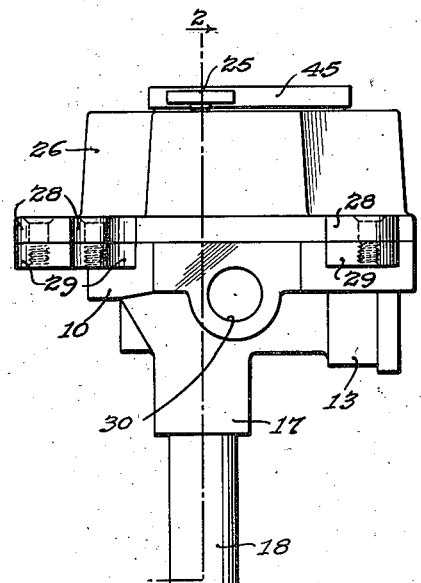

1,217,601.

Patented Feb. 27, 1917.
2 SHEETS—SHEET 2.

WITNESSES
L. M. Collins.
J. M. Geoghegan.

INVENTOR
William C. Housholder
By James N. Cooke
atty.

UNITED STATES PATENT OFFICE.

WILLIAM C. HOUSHOLDER, OF YOUNGWOOD, PENNSYLVANIA.

TEMPERATURE REGULATING AND INDICATING DEVICE.

1,217,601.

Specification of Letters Patent.　　Patented Feb. 27, 1917.

Application filed March 14, 1916.　Serial No. 84,250.

*To all whom it may concern:*

Be it known that I, WILLIAM C. HOUSHOLDER, a citizen of the United States, and resident of Youngwood, in the county of Westmoreland and State of Pennsylvania, have invented a new and useful Improvement in Temperature Regulating and Indicating Devices; and I do hereby declare the following to be a full, clear, and exact description thereof.

My invention pertains to temperature regulating and indicating devices. It is an object of my invention to produce a simple and efficient device for automatically shutting off the supply of fuel when the substance to be heated has reached a predetermined degree of temperature. It is another object of the invention to provide such a device with means for indicating at all times the temperature of the substance being heated. It is another object of the invention to provide such a device with a simple and convenient means for adjustment, to permit of the fuel being cut off at various predetermined temperatures of the substance being heated. It is still another object of the invention to provide a device of the character set forth above, in which the operating parts will be readily accessible for inspection, adjustment or repair. And other and further objects of the invention will appear from the following specification taken in connection with the appended claims.

By way of example, I have shown in the accompanying drawings, and described in the following specification, one form of temperature regulating and indicating device constructed in accordance with my invention. It is to be understood, however, that the invention may be embodied in other forms, and that changes may be made in the embodiment described and shown, without exceeding the scope of the invention as defined in the appended claims.

In the drawings:

Figure 1 is a side elevation of a temperature regulator and indicator constructed in accordance with my invention, and of a type intended for controlling the supply of gas to a gas burner;

Fig. 2 is a sectional elevation, the section being taken on the lines 2—2 of Figs. 1 and 4, looking in the direction of the arrows;

Fig. 6 is a detailed section taken on the lines 6—6 of Fig. 3, looking in the direction of the arrows.

Like reference characters refer to like parts throughout the following specification, and the several figures of the accompanying drawings.

Figure 3:
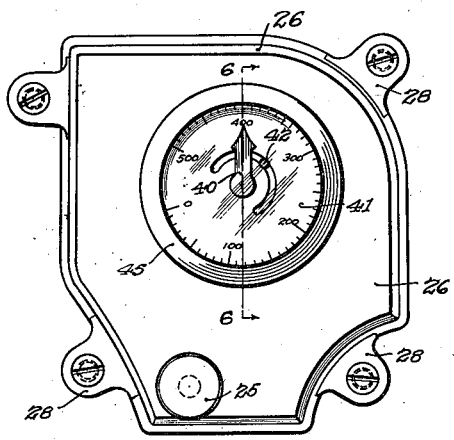
Fig. 3 is a top plan of the device.

Referring now to the drawings, 10 indicates a dished base having a depression 11 formed therein, which depression communicates, by means of a passage 12, with a socket 13 for receiving the end of the outlet gas pipe. Centrally disposed in the depression is a guide 14 for slidably receiving the stem 15 of a valve 16, which valve is vertically movable, so as to permit the entrance of gas to the passage 12 when raised, but to seat, when lowered upon the rim of the depression 11, and thereby prevent the entrance of gas to the passage 12.

Extending downwardly from the base 10, is a socket 17 which is internally threaded to receive the end of a closed pipe 18, the expansion and contraction of which controls the valve 16. The pipe 18 is usually of iron; but, where a greater expanding and contracting movement is desired, it may be of copper or the like. Resting upon the bottom of the pipe 18 is a rod or tube 19 formed of glass or the like, upon the upper end of which rests a stub 20 threaded, so as to be capable of adjustment into a lever 21, which is pivoted to the base 10, at 22. The lever 21 is thus supported by the stub 20, resting on the top of the rod 19. Pivoted to the end of the lever 21 remote from the pivot 22 is an adjusting lever 23, one end of which engages in a stirrup 24 extending upwardly from the valve 16. The other end of the lever 23 is engaged by an adjusting screw 25, carried by the cover now to be described.

Upon the base 10 is mounted a dished cover 26, the cover and base being connected together by means of screws engaging with lugs 28 on the cover and corresponding lugs 29 upon the base. A gasket 27 is inserted between the base and the cover in order to form a gas tight connection. In this way the cover and base form together a gas tight chamber, into which gas is introduced by means of a pipe threaded into a socket 30 formed in the base 10.

Figure 5:
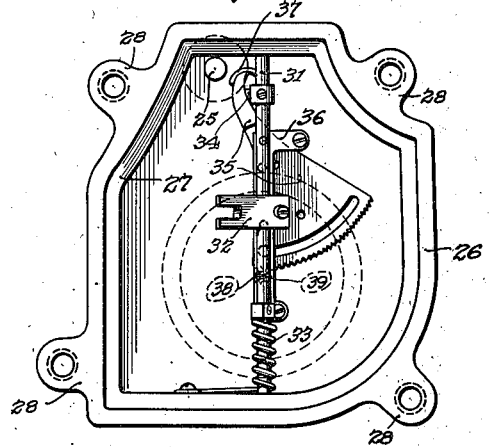
Fig. 5 is an inverted plan of the cover.
Figure 4:
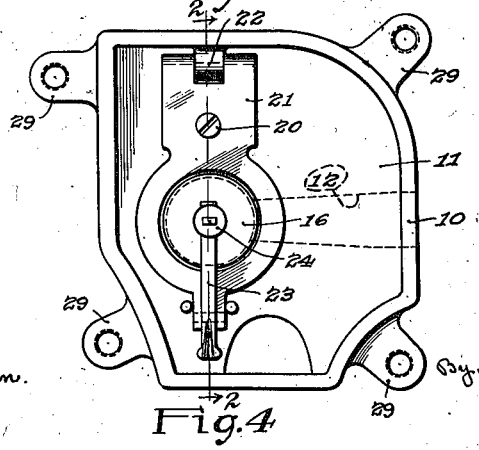
Fig. 4 is a top plan of the device with the cover removed.

Rockably mounted in the cover 26, and extending from one side to the other thereof is a spindle 31, which is provided with a forked lever 32 which embraces a small projection formed at the top of the stirrup 24 of the valve 16. A spiral spring 33 tends to press the lever 32 firmly upon the stirrup 24. The spindle 31 has also extending therefrom an arm 34 (Figs. 2 and 5) which engages the end of a segment lever 35 which is pivoted in a frame 36 carried by the top of the cover 26. So as to permit movement of the segment lever 35 in an opposite direction, the latter has attached thereto a leaf spring 37, which is placed opposite the end of the segment lever 35, at the part where the latter is engaged by the arm 34. The segment lever 35 meshes with a pinion 38 carried by a spindle 39, which extends upwardly through the cover 26 and is provided with a hand 40. Beneath the hand 40, and surrounding the spindle 39, is a dial 41, which is capable of angular adjustment, and can be secured in its adjusted position by means of a set screw 42. An externally screw threaded flange 43 surrounds the dial 41, and carries a glass bezel 44, which latter is secured in place by means of a threaded ring 45, a gasket 46 being interposed between the bezel and the top of the flange 43 so as to provide a gas tight connection.

The operation of the device is as follows:

It is understood that the thermostatic element, in this instance the pipe 18, is inserted in the space or substance to be heated, and that a gas inlet pipe is connected to the socket 30 and a pipe leading to the burners is connected to the socket 13. Assuming that the regulating screw 25 has been adjusted for a maximum temperature of 400°, and that such heat has been reached, the parts will be in the position shown in Fig. 2, the valve 16 having just reached its closed position, and the gas, therefore, being cut off. Owing to the cutting off of the gas, the temperature will decrease, permitting the pipe 18 to contract, thereby raising the lever 21 and opening the valve 16 again, whereupon gas will be admitted to the burners and the temperature raised again. The movements of the valve 16 are communicated to the hand 40, which latter at all times indicates the actual temperature. When it is desired to change the adjustment of the device to cause it to operate at a different predetermined temperature, this is effected by manipulating the adjusting screw 25 and effecting a corresponding adjustment of the dial 41.

It will be seen that the device is of an extremely simple and rugged construction, and that there are no parts which are at all liable to get out of order. It will maintain the temperature of the substance being heated uniformly at the desired predetermined degree; and this degree may be varied at will by changing the adjustment of the screw 25. During the operation of the device, as well as when the substance under treatment is being heated up to required degree, or is being allowed to cool off, the temperature of such substance is always indicated by the hand 40.

Having thus fully described my invention what I claim as new and desire to secure by Letters Patent is:

1. A temperature regulating and indicating device comprising a support, a fuel valve associated with said support, a lever pivotally associated with said support, a second lever pivotally connected with said first named lever and coöperating with said valve, a heat-responsive element coöperating with said first named lever, a spring-pressed rockable spindle, an arm on said spindle disposed for engagement with said valve, and an indicating device operated by said spindle.

2. A temperature regulating and indicating device comprising a support, a fuel valve associated with said support, a heat-responsive member, means, controlled by said heat-responsive member, for operating said valve at predetermined temperatures, a spring pressed rockable spindle, an arm on said spindle disposed for engagement with said valve, and a temperature indicating device operated by said spindle.

3. A temperature regulating and indicating device comprising a support, a fuel valve associated with said support, a lever pivotally associated with said support, a second lever pivotally connected with said first-named lever and coöperating with said valve, a heat-responsive element coöperating with said first-named lever, a spring pressed rockable spindle, an arm on said spindle disposed for engagement with said valve, a pivoted toothed segment, connection means between said segment and said spindle, and a temperature indicating hand actuated by said segment.

In testimony whereof, I the said WILLIAM C. HOUSHOLDER have hereunto set my hand.

WILLIAM C. HOUSHOLDER.

Witnesses:
CALVIN F. MORRIS,
CHAS. F. MILLER.